Figure 1:
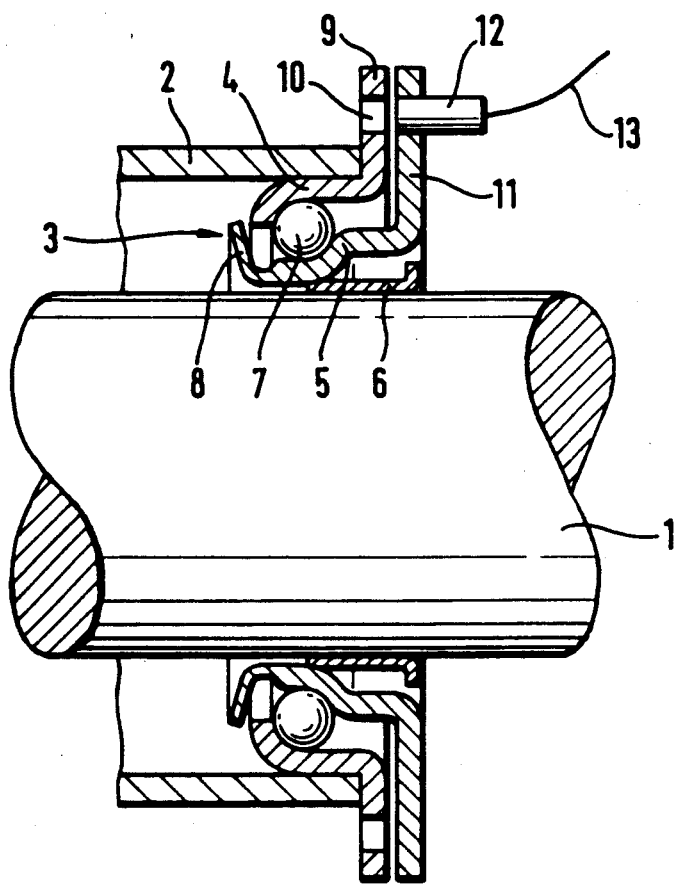

United States Patent [19]

Zernickel et al.

[11] Patent Number: 5,002,404
[45] Date of Patent: Mar. 26, 1991

[54] RADIAL ROLLING BEARINGS

[76] Inventors: Alexander Zernickel, Sternstrasse 3; Hellmut Adler, Von-Erthal-Strasse 6, both of 8522 Herzogenaurach, Fed. Rep. of Germany

[21] Appl. No.: 509,946

[22] Filed: Apr. 16, 1990

[30] Foreign Application Priority Data

Apr. 29, 1989 [DE] Fed. Rep. of Germany ....... 3914289

[51] Int. Cl.$^5$ .................. F16C 19/52; F16C 33/58
[52] U.S. Cl. .................................... 384/448; 384/515
[58] Field of Search ............. 384/448, 456, 513, 515; 310/168, 155; 324/166, 173, 174, 207.25

[56] References Cited

U.S. PATENT DOCUMENTS 3,890,517 6/1975 Marsh et al. ...................... 310/168
4,795,278 1/1989 Hayashi .............................. 384/448

Primary Examiner—Thomas R. Hannon

[57] ABSTRACT

A radial rolling bearing with a pulse pick-up device for the determination of the rotational speed and angle of rotation of the bearing and/or the direction of rotation, which bearing comprises at least one race ring with rolling elements between the race ring and a counter raceway concentric with it, rolling elements roll and which at one end is provided with a pulser ring in the form of a radial sheet metal flange with recesses or through holes distributed over its periphery, characterized in that the race ring is made as a thin-walled component which at one end face merges into an integrally formed and radially directed flange.

3 Claims, 1 Drawing Sheet

RADIAL ROLLING BEARINGS

STATE OF THE ART

Radial rolling bearings with a pulse pick-up device for the determination of the rotational speed and angle of rotation of the bearing and/or the direction of rotation, which bearing comprises at least one race ring between which and a counter raceway concentric with it, rolling elements roll and which at one end is provided with a pulser ring in the form of a radial sheet metal flange with recesses or through holes distributed over its periphery are known. Such rolling bearings of different types of constructions have been knwon for a long time, and they are used for example, for the mounting of steering columns in automotive vehicles, in which case, they are made as a rule as angular contact ball bearings.

In recent times, it has been proposed to determine the angle and the direction of turn of the steering column by optical or electrical sensor devices and to transmit this information to a control device which, in its turn, builds up counterforces by hydraulic or pneumatic means between the wheels on the one hand and the vehicle body on the other, which forces oppose a lateral inclination of the vehicle body when it is driven in curves.

For different reasons, it has been proposed recently to mount pulser rings in rolling bearing parts which cooperate with pulse detectors to determine, in every driving condition, for example, for the automatic protection of the vehicle wheels against blocking, whether and if so, how fast each wheel is turning. In this connection, it has been proposed, for example in DE-U-88-14,620, to dispose a pulser ring made of sheet material on a surface of a rotatable rolling bearing race ring and to fix it there by interlocking with the helping of projecting portions formed out of it. In this manner of fixing the pulser ring, the danger exists that it does not get fixed exacly at a right angle to the bearing axis so that in operation, a wobbling movement of the pulser ring results. There is also the danger of the pulser ring getting slightly deformed when being fixed at one or more peripheral points, so that a "fluttering" movement of the pulser ring occurs during operation. Such deviations from the standard are absolutely inadmissible for the proposed uses because for an exact determination of rotation and rotational speed, it is vital that the pulser ring maintain at all times, an exact axial distance predetermined within narrow limits, from the pulse detector.

British application No. 2,204 646 described a radial rolling bearing with a pulse pick-up device in which a radial flange with an annular groove is formed at one end face of the solid outer race ring. In this case, a special component is required as the pulser ring which is inserted in the form of a toothed ring in the groove.

French application No. 2,217,998 shows a radial rolling bearing with two rows of rolling elements situated in a common radial plane. In this bearing, the recesses or through holes of the radial flange of one of the race rings are provided for its fixing, while the radial flange of the race ring of the counter raceway situated in the same plane as the first flange is provided with notches at its periphery to give it a certain amount of elasticity. This bearing is, however, not provided with a pulse pick-up device.

OBJECTS OF THE INVENTION

It is an object of the invention to provide a rolling bearing with a pulser ring or a complete pulse pick-up device without the need of additional components and particularly without the danger of the pulser ring being damaged or deformed.

This and other objects and advantages of the invention will become obvious from the following detailed description.

THE INVENTION

The novel radial rolling bearing of the invention with a pulse pick-up device for the determination of the rotational speed and angle of rotation of the bearing and/or the direction of rotation, which bearing comprises at least one race ring between which and a counter raceway concentric with it, rolling elements roll and which at one end is provided with a pulser ring in the form of a radial sheet metal flange with recesses or through holes distributed over its periphery, is characterized in that the race ring is made as a thin-walled component which at one end face merges into an integrally formed and radially directed flange.

The race ring is made as a thin-walled component, particularly by drawing out of sheet material, which at one end face merges into an integrally formed and radially directed flange, and this flange, provided with recesses or through holes, forms the pulser ring. Because it is manufactured integrally with the rolling bearing ring and thus no additional work step is required for fixing it, the danger of its being damaged or deformed during such a fixing operation is eliminated. On the contrary, by the integral manufacturing of the pulser ring it can not only be guaranteed that the flange forming the pulser ring is exactly planar but also that it is arranged exactly parallel to the rolling bearing raceway, by which wobbling movements during operation are excluded.

In a further development of the invention, the counter raceway as well can be arranged in a thin-walled race ring made particularly by drawing out of sheet material, which race ring at one end face likewise merges into an integrally formed and radially directed flange which extends parallel to the flange of the first thin-walled race ring at a small distance from it and which is provided with means for the fixing of a pulse detector at least one point of its periphery. In this way, it is possible to provide the rolling bearing itself with a complete pulse pick-up device without the need of additional components. The purchaser of such a rolling bearing has then only to fix the pulse detector at the means provided therefor without having to execute other work steps, particularly such that would prejudice the precision of movement.

Figure 2:
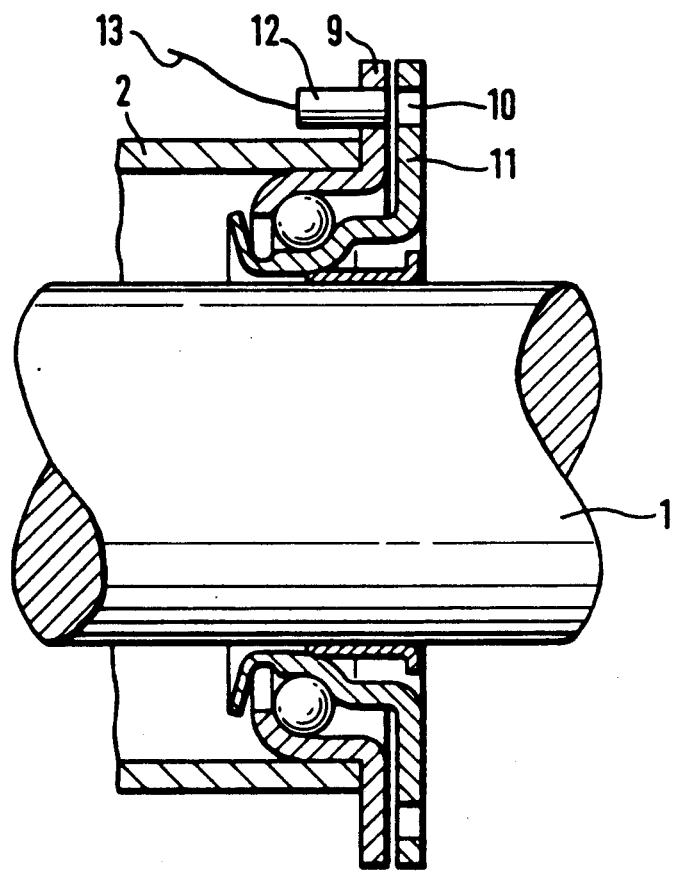

Referring now to the drawings:

FIGS. 1 and 2 are longitudinal cross-section of two different embodiments of the radial rolling bearings of the invention.

In FIG. 1, the steering shaft 1 is mounted in the steering tube 2 by a radial rolling bearing 3 which radial rolling bearing comprises the outer race ring 4 which is pressed into the steering tube 2 and the inner race ring 5 which is fixed to the steering shaft 1 by the intermediary of a tolerance ring 6. Between the two races rings, balls 7 roll in approximately shaped raceways. At one end of the inner race ring 5, a retaining flange 8 is formed which interlocks with the outer race ring 4 and thus prevents the two race rings from coming apart from each other in the non-mounted state.

On the opposite side, the outer race ring 4 is provided with a radially outwards directed flange 9 comprising through holes 10 distributed over its periphery. On the same side, the inner race ring 5 is likewise provided with a flange 11 extending parallel to the flange 9 at a small distance from it. At one point of its periphery, the flange 11 is provided with a through hole in which a pulse detector 12 is fixed which transmits the pulses received to a control device via an electric lead 13.

The embodiment of the invention represented in FIG. 2 differs from that of FIG. 1 only by the fact that in this case, the flange 11 of the inner race ring 5 is provided with the through holes 10 and thus functions as the pulser ring, while the flange 9 of the outer race ring 4 carries the pulse detector 12.

Various modifications of the bearing of the invention may be made without departing from the spirit or scope thereof and it is to be understood that the invention is intended to be limited only as defined in the appended claims.

What we claim is:

1. A radial rolling bearing with a pulse pick-up device for the determination of the rotational speed and angle of rotation of the bearing and/or the direction of rotation, which bearing comprises at least one race ring with rolling elements between the said race ring and counter raceway concentric with the race ring, and which at one end is provided with a pulser ring in the form of a radial sheet metal flange with recesses or through holes distributed over the pulser ring periphery, characterized in that the race ring is made as a thin-walled component which at one end face merges into an integrally formed and radially directed flange.

2. The radial rolling bearing of claim 1 wherein the thin-walled component is made of drawn sheet metal.

3. A radial rolling bearing of claim 1 wherein the counter raceway is also arranged on a thin-walled race ring made of drawn sheet metal, which race ring at one end face merges into an integrally formed and radially directed flange which extends parallel to the flange of the first thin-walled race ring at a small distance from it and which is provided with means for the fixing of a pulse detector at at least one point of the flange's periphery.

* * * * *

UNITED STATES PATENT AND TRADEMARK OFFICE
CERTIFICATE OF CORRECTION

PATENT NO. : 5,002,404
DATED : March 26, 1991
INVENTOR(S) : Alexander Zernickel and Hellmut Adler It is certified that error appears in the above-identified patent and that said Letters Patent is hereby corrected as shown below:

| Col. | Line | Assignee | |
|------|------|----------|---|
| [73] |      | Left Out | --INA Wälzlager Schaeffler KG Fed. Republic of Germany-- |

Signed and Sealed this

Fifteenth Day of September, 1992

*Attest:*

DOUGLAS B. COMER

*Attesting Officer*     *Acting Commissioner of Patents and Trademarks*